(12) United States Patent
Liu

(10) Patent No.: US 12,535,274 B2
(45) Date of Patent: Jan. 27, 2026

(54) HEAT EXCHANGER, HEAT PUMP SYSTEM AND DISHWASHER

(71) Applicants: Guangdong Midea White Home Appliance Technology Innovation Center Co., Ltd., Foshan (CN); Midea Group Co., Ltd., Foshan (CN)

(72) Inventor: Xunwei Liu, Foshan (CN)

(73) Assignees: Guangdong Midea White Home Appliance Technology Innovation Center Co., Ltd., Foshan (CN); Midea Group Co., Ltd., Foshan (CN)

( * ) Notice: Subject to any disclaimer, the term of this patent is extended or adjusted under 35 U.S.C. 154(b) by 162 days.

(21) Appl. No.: 18/369,669

(22) Filed: Sep. 18, 2023

(65) Prior Publication Data

US 2024/0003632 A1    Jan. 4, 2024

Related U.S. Application Data

(63) Continuation of application No. PCT/CN2022/122242, filed on Sep. 28, 2022.

(30) Foreign Application Priority Data

Nov. 24, 2021 (CN) .......................... 202111418336.6

(51) Int. Cl.
    *F28D 7/00*         (2006.01)
    *F28D 21/00*      (2006.01)
    *F28F 13/08*      (2006.01)

(52) U.S. Cl.
    CPC ........... *F28D 7/0016* (2013.01); *F28D 21/00* (2013.01); *F28F 13/08* (2013.01); *F28D 2021/0019* (2013.01)

(58) Field of Classification Search
    CPC ............. F28D 21/00; F28D 2021/0019; F28D 7/0016; F28F 13/08
    See application file for complete search history.

(56) References Cited

U.S. PATENT DOCUMENTS 342,871 A      6/1886   Hocking
3,379,244 A  *   4/1968   Gilli .......................... F28D 7/04
                                                       165/DIG. 414

(Continued)

FOREIGN PATENT DOCUMENTS

CN           2657750 Y   *   7/2003
CN         101566437 A      10/2009

(Continued)

OTHER PUBLICATIONS

Weijie Zhang et al., "An Experimental Study on Heat Transfer Characteristics of Casing Tube Bundle Heat Exchanger", High Technology Communication, Issue 6, Dec. 31, 2009, 9 pgs.

(Continued)

*Primary Examiner* — Devon Lane
(74) *Attorney, Agent, or Firm* — Morgan, Lewis & Bockius LLP

(57) ABSTRACT

A heat exchanger includes an outer sleeve provided with two open ends, and at least one diversion unit group provided in the outer sleeve. A first flow channel is formed between the outer sleeve and the diversion unit group for a first fluid to flow from one end to the other end of the outer sleeve. The diversion unit group includes a first hollow vane, a connecting channel and a second hollow vane sequentially provided along an axial direction of the outer sleeve. The first hollow vane, the connecting channel and the second hollow vane are sequentially connected to form a second flow channel for the second fluid to flow from one end to the other end of the outer sleeve.

12 Claims, 6 Drawing Sheets

(56) References Cited

U.S. PATENT DOCUMENTS

| | | |
|---|---|---|
| 2017/0003080 A1 | 1/2017 | Whaites et al. |
| 2018/0372426 A1 | 12/2018 | Alahyari et al. |
| 2020/0049432 A1 | 2/2020 | Manay |
| 2021/0148614 A1* | 5/2021 | Melink ............... F24D 17/0005 |
| 2021/0180870 A1* | 6/2021 | Briselden ............. F28D 21/001 |

FOREIGN PATENT DOCUMENTS

| | | | | |
|---|---|---|---|---|
| CN | 101738110 A | | 6/2010 | |
| CN | 103070656 A | | 5/2013 | |
| CN | 105258533 A | | 1/2016 | |
| CN | 106949766 A | | 7/2017 | |
| CN | 107762707 A | | 3/2018 | |
| CN | 207095362 U | | 3/2018 | |
| CN | 207907416 U | | 9/2018 | |
| CN | 110174009 A | * | 8/2019 | ............... F28D 7/14 |
| CN | 114061335 A | | 2/2022 | |
| FR | 2627265 A1 | * | 2/1988 | |
| GB | 219329 A | | 10/1925 | |
| JP | H 01230994 A | | 9/1989 | |
| JP | 2014070871 A | | 4/2014 | |
| WO | WO-2008113604 A1 | * | 9/2008 | ............... E03F 1/00 |

OTHER PUBLICATIONS

Midea Group Co., Ltd., 1st CN Office Action, CN Patent Application No. 202111418336.6, May 7, 2023, 14 pgs.

Midea Group Co., Ltd., Chinese Notice of Grant, CN Patent Application No. 202111418336.6, Jun. 30, 2023, 5 pgs.

Midea Group Co., Ltd., ISR, PCT/CN2022/122242, Dec. 15, 2022, 3 pgs.

Midea Group Co., Ltd., WO, PCT/CN2022/122242, Dec. 15, 2022, 5 pgs.

Midea Group Co., Ltd., IPRP, PCT/CN2022/122242, May 2, 2026, 6 pgs.

Midea Group Co., Ltd., Extended European Search Report, EP Patent Application No. 22897373.1, Jul. 24, 2024, 6 pgs.

* cited by examiner

HEAT EXCHANGER, HEAT PUMP SYSTEM AND DISHWASHER

CROSS-REFERENCE TO RELATED APPLICATIONS

This application is a continuation of International Patent Application No. PCT/CN2022/122242, filed on Sep. 28, 2022, which claims priority to Chinese Patent Application No. 202111418336.6, filed on Nov. 24, 2021, the entire contents of which are incorporated herein by reference.

TECHNICAL FIELD

The present application relates to the technical field of heat exchange, in particular to a heat exchanger, a heat pump system and a dishwasher.

BACKGROUND

A heat exchanger is a device that enables two fluids at different temperatures to exchange heat. Heat is transferred from a fluid with a high temperature to a fluid with a low temperature, thereby heating or cooling the fluid. For example, both the condenser and the evaporator in the heat pump system are types of heat exchangers. The condenser of the heat pump system generally adopts a double-tube heat exchanger. However, the average heat exchange area in the tube of the traditional double-tube heat exchanger may be too small, and the residence time of the fluid per unit length may be too short, resulting in the overall heat exchanger that may be excessively long and occupying too much volume.

SUMMARY

In some embodiments, a heat exchanger includes: an outer sleeve provided with two open ends; and at least one diversion unit group provided in the outer sleeve.

A first flow channel is formed between the outer sleeve and the diversion unit group for a first fluid to flow from one end to the other end of the outer sleeve.

The diversion unit group includes a first hollow vane, a connecting channel, and a second hollow vane sequentially provided along an axial direction of the outer sleeve.

The first hollow vane, the connecting channel and the second hollow vane are sequentially connected to form a second flow channel for a second fluid to flow from one end to the other end of the outer sleeve.

In some embodiments, the first hollow vane, the connecting channel, and the second hollow vane are twisted and inclined relative to an axis of the outer sleeve.

In some embodiments, a twist and incline direction of the first hollow vane and the second hollow vane are the same, and a twist and incline direction of the connecting channel and the first hollow vane are opposite.

In some embodiments, the connecting channel is attached to an inner wall surface of the outer sleeve.

In some embodiments, the diversion unit group further includes a first central tube and a second central tube.

The first hollow vane is fixed on an outer periphery of the first central tube, one end of the first central tube away from the connecting channel is provided with a fluid inlet, the other end of the first central tube is closed, a peripheral wall of the first central tube is provided with a first through hole communicated with the first hollow vane.

The second hollow vane is fixed on an outer periphery of the second central tube, one end of the second central tube away from the connecting channel is provided with a fluid outlet, the other end of the second central tube is closed, and a peripheral wall of the second central tube is provided with a second through hole communicated with the second hollow vane.

In some embodiments, in one diversion unit group, a plurality of the first hollow vanes, the connecting channels and the second hollow vanes are provided in a one-to-one correspondence.

Each of the first hollow vanes is spaced apart along a circumferential direction of the first central tube, the peripheral wall of the first central tube is provided with a plurality of the first through holes along the circumferential direction, and the first through holes and the first hollow vanes are communicated in a one-to-one correspondence.

Each of the second hollow vanes is spaced apart along a circumferential direction of the second central tube, and the peripheral wall of the second central tube is provided with a plurality of the second through holes along the circumferential direction, the second through holes and the second hollow vanes are communicated in a one-to-one correspondence.

Each of the connecting channels is connected between the first hollow vane and the second hollow vane in a one-to-one correspondence.

In some embodiments, both the first central tube and the second central tube are straight tubes extending coaxially with the outer sleeve, a plurality of the first hollow vanes are evenly spaced apart along the circumferential direction of the first central tube, and the plurality of second hollow vanes are evenly spaced apart along the circumferential direction of the second central tube.

In some embodiments, at least two diversion unit groups are provided, and each group of the diversion unit groups is provided along the axial direction of the outer sleeve and communicated sequentially.

The present application further provides a heat pump system, including a compressor, a condenser, a throttle valve and an evaporator.

The compressor, the condenser, the throttle valve, and the evaporator are communicated with each other to form a circulation circuit, and the condenser adopts the above heat exchanger.

The present application further provides a dishwasher including the above heat pump system.

In some embodiments, a diversion unit group includes a first hollow vane, a connecting channel, and a second hollow vane sequentially provided along an axial direction of the outer sleeve. A first flow channel is formed between the outer sleeve and the diversion unit group for a first fluid to flow from one end to the other end of the outer sleeve. When the heat exchanger is working, the first fluid (such as water) and the second fluid (such as refrigerant) flow in reverse directions in the first flow channel and the second flow channel respectively. The first flow channel and the second flow channel are both structure extending from one end to the other end of the outer sleeve, so that the effective length of the flow channel and the effective flow path of the fluid can be extended as much as possible without increasing the length of the outer sleeve. At the same time, the first hollow vane and the second hollow vane are hollow sheet structures, which can effectively increase the contact area between the first fluid and the second fluid, and increase the residence time of the first fluid and the second fluid in the corresponding flow channel, thereby effectively improving the heat exchange efficiency. Therefore, compared with the traditional double-tube heat exchanger, the overall length of the heat exchanger may be shortened in some embodiments, the overall occupied volume of the heat exchanger may be reduced, and the heat exchange efficiency may be improved.

BRIEF DESCRIPTION OF THE DRAWINGS

The drawings in the following description are only some embodiments of the present application. It will be apparent to those skilled in the art that other figures can be obtained according to the structures shown in the drawings without creative work.

DESCRIPTION OF REFERENCE SIGNS

Figure 1:
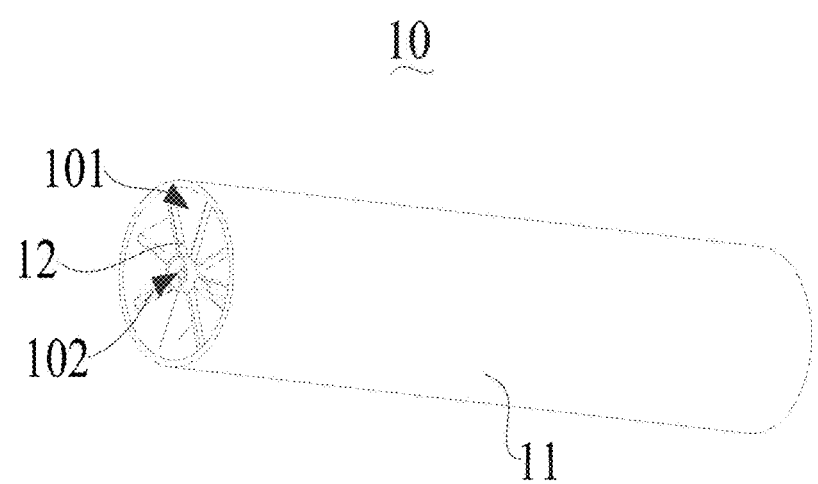
FIG. 1 is a schematic structural view of a heat exchanger according to some embodiments of the present application.

| Reference sign | Name | Reference sign | Name |
| --- | --- | --- | --- |
| 10 | heat exchanger | 123 | second hollow vane |
| 11 | outer sleeve | 124 | first central tube |
| 12 | diversion unit group | 1241 | fluid inlet |
| 101 | first flow channel | 1242 | first through hole |
| 102 | second flow channel | 125 | second central tube |
| 121 | first hollow vane | 1251 | fluid outlet |
| 122 | connecting channel | 1252 | second through hole |
| 200 | dishwasher | 24 | evaporator |
| 20 | heat pump system | 25 | fan |
| 21 | compressor | 26 | circulating pump |
| 22 | condenser | 27 | cavity sink |
| 23 | throttle valve | 28 | spray arm |

The realization of the objective, functional characteristics, and advantages of the present application are further described with reference to the accompanying drawings.

DETAILED DESCRIPTION OF THE EMBODIMENTS

The described embodiments are only a part of the embodiments of the present application, not all of the embodiments. Based on the embodiments in the present application, all other embodiments perceived by those ordinary skills in the art without creative effort should be fallen within the protection scope of the present application.

It should be noted that all of the directional instructions in the embodiments of the present application (such as, up, down, left, right, front, rear . . . ) are only used to explain the relative position relationship and movement of each component under a specific attitude (as shown in the drawings), if the specific attitude changes, the directional instructions will change correspondingly.

Besides, the descriptions in the present application that refer to "first," "second," etc. are only for descriptive purposes and are not to be interpreted as indicating or implying relative importance or to implicitly indicate the number of technical features indicated. Thus, a feature defined as "first" or "second" may explicitly or implicitly include at least one of the features. In addition, the meaning of "and/or" appearing in the whole text includes three parallel solutions. For example, "A and/or B" includes only A, or only B. or both A and B. Furthermore, technical solutions among the embodiments can be combined with each other, but must be based on the realization of the technical solutions by those skilled in the art, and when the technical solutions are contradictory to each other or cannot be realized, the technical solutions should be considered that the combination does not exist, and the technical solutions are not fallen within the protection scope claimed in the present application.

The present application provides a heat exchanger 10.

Figure 2:
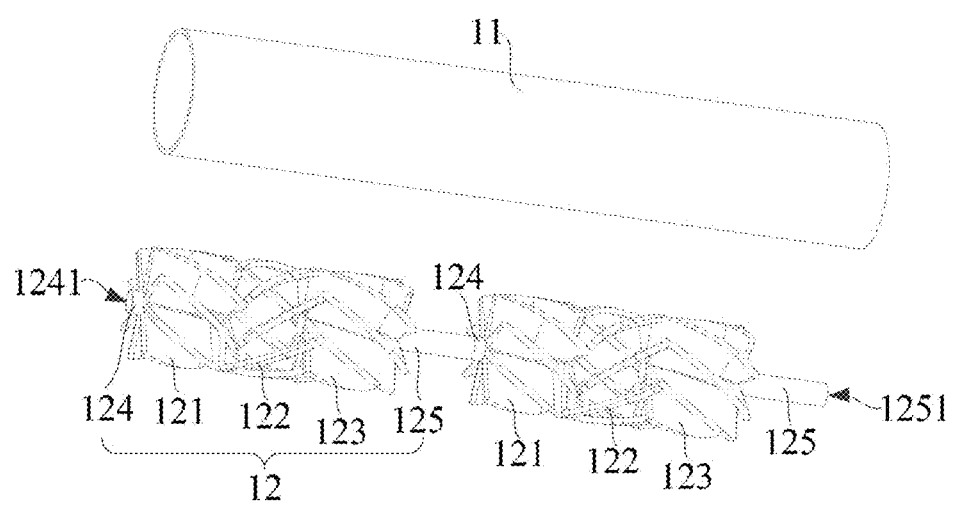
FIG. 2 is an exploded structural view of the heat exchanger in FIG. 1.

As shown in FIG. 1 and FIG. 2, in some embodiments of the present application, the heat exchanger 10 includes an outer sleeve 11 and at least one set of diversion unit groups 12. The outer sleeve 11 is provided with two open ends, the diversion unit group 12 is provided in the outer sleeve 11, a first flow channel 101 is formed between the outer sleeve 11 and the diversion unit group 12 for a first fluid to flow from one end to the other end of the outer sleeve 11. The diversion unit group 12 includes a first hollow vane 121, a connecting channel 122 and a second hollow vane 123 provided in sequence along an axial direction of the outer sleeve 11. The first hollow vane 121, the connecting channel 122 and the second hollow vane 123 are sequentially connected to form a second flow channel 102 for the second fluid to flow from one end to the other end of the outer sleeve 11.

In some embodiments, the outer sleeve 11 is in a hollow tubular shape, and the two ends of the outer sleeve 11 are open. The diversion unit group 12 is provided in the outer sleeve 11. The first flow channel 101 is formed between the inner peripheral surface of the outer sleeve 11 and the outer surface of the diversion unit group 12, so that the first fluid can flow from one end to the other end of the outer sleeve 11 along the first flow channel 101. The second flow channel 102 is formed inside the diversion unit group 12, the second fluid can flow from one end to the other end of the outer sleeve 11 along the second flow channel 102. For example, in practical applications, the first fluid may be water, and the second fluid may be refrigerant. The water and the refrigerant are provided in reverse flow, that is, water enters the first flow channel 101 from the first open end of the outer sleeve 11, and then flows through the first flow channel 101 to the second open end of the outer sleeve 11 for output. The refrigerant enters the second flow channel 102 from the second open end of the outer sleeve 11, and then passes through the second flow channel 102 to the first open end of the outer sleeve 11 for output. The flow directions of water and refrigerant are opposite, the water and refrigerant flow in the first flow channel 101 and the second flow channel 102 respectively, and realize heat exchange with during flowing.

Figure 3:
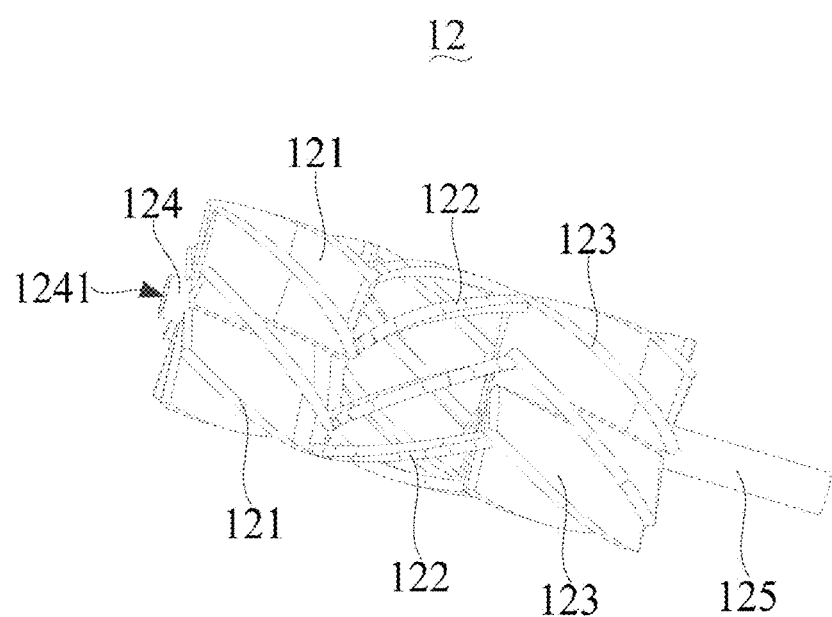
FIG. 3 is a schematic structural view of one diversion unit group.
Figure 4:
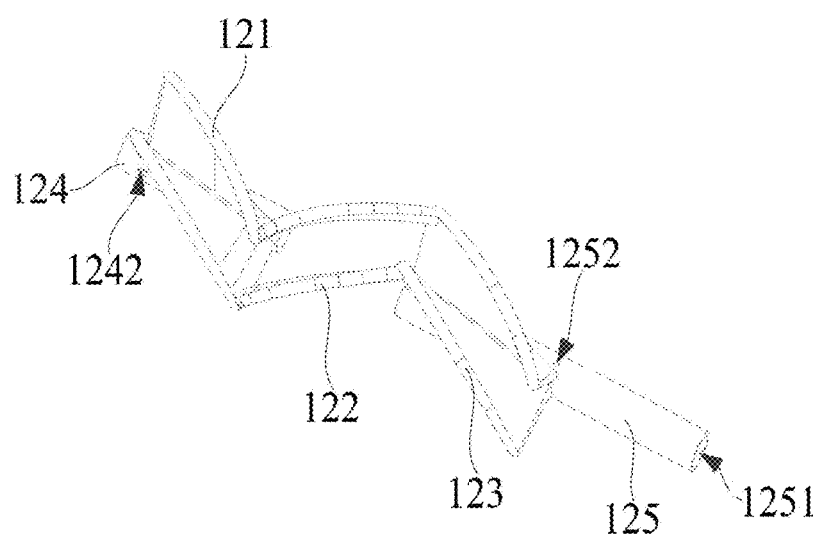
FIG. 4 is a partial structural view of the diversion unit group in FIG. 3.

It should be noted that, in some embodiments, the specific quantity of diversion unit groups 12 in the outer sleeve 11 can be provided according to actual needs, for example, one, two or more sets of diversion unit groups 12 can be provided. As shown in FIG. 2, there are two sets of diversion unit groups 12, which is only some embodiments of the present application, and is not a limitation to the present application. For the convenience of description, only one set of diversion unit groups 12 is taken as an example for description below. As shown in FIG. 3 and FIG. 4, the diversion unit group 12 includes the first hollow vane 121, the connecting channel 122 and the second hollow vane 123 sequentially provided along the axial direction of the outer sleeve 11. The first hollow vane 121 and the second hollow vane 123 are in a wide sheet structure, and the connecting channel 122 is in an elongated tubular structure. One end of the connecting channel 122 is connected and communicated with the first hollow vane 121, and the other end of the connecting channel 122 is connected and communicated with the second hollow vane 123. The second fluid (such as refrigerant) first enters the first hollow vane 121, then enters the connecting channel 122 through the end of the first hollow vane 121, then flows into the second hollow vane 123 through the connecting channel 122, and finally flows out from the second hollow vane 123. The entire flow path of the second fluid (that is, the second flow channel 102) is rather than straight, so the effective length of the flow channel can be extended, and the flow path of the second fluid can be extended. The first hollow vanes 121 and the second hollow vanes 123 have a wide sheet structure, which can increase the contact area between the second fluid and the first fluid, thereby improving heat exchange efficiency.

In some embodiments, a diversion unit group 12 is provided in the outer sleeve 11, the diversion unit group 12 includes a first hollow vane 121, a connecting channel 122 and a second hollow vane 123 sequentially provided along the axial direction of the outer sleeve 11. The first flow channel 101 is formed between the outer sleeve 11 and the diversion unit group 12 for the first fluid to flow through. The first hollow vane 121, the connecting channel 122 and the second hollow vane 123 are sequentially connected to form the second flow channel 102 for the second fluid to flow through. When the heat exchanger 10 is working, the first fluid (such as water) and the second fluid (such as refrigerant) flow in reverse directions in the first flow channel 101 and the second flow channel 102 respectively. The first flow channel 101 and the second flow channel 101 are structure and are extended from one end to the other end of the outer sleeve 11, so that the effective length of the flow path can be extended as much as possible without increasing the length of the outer sleeve 11, and the effective flow distance of the fluid can be extended. Both the first hollow vane 121 and the second hollow vane 123 have a hollow sheet structure, which can effectively increase the contact area between the first fluid and the second fluid, increase the residence time of the first fluid and the second fluid in the corresponding flow channel. Thus, the heat exchange efficiency may be effectively improved. Therefore, compared with the traditional double-tube heat exchanger, in some embodiments, the overall length of the heat exchanger 10 may be shortened, the overall occupied volume of the heat exchanger 10 may be reduced, and a heat exchange efficiency may be improved.

Further, the first hollow vane 121, the connecting channel 122 and the second hollow vane 123 are twisted and inclined relative to the axis of the outer sleeve 11. Taking the first hollow vane 121 as an example, the first hollow vane 121 is twisted and inclined relative to the axis of the outer sleeve 11, that is, the first hollow vane 121 has a certain twist angle relative to the axis of the outer sleeve 11. The first hollow vane 121 extends along the axial direction of the outer sleeve 11 and twists along the circumferential direction of the outer sleeve 11, so that the first hollow vane 121 presents a twisted shape rather than a completely planar structure. Similarly, the second hollow vane 123 is also twisted and inclined relative to the axis of the outer sleeve 11, so that the second hollow vane 123 presents a twisted shape rather than a completely planar structure. The connecting channel 122 is twisted and inclined relative to the axis of the outer sleeve 11, so that the connecting channel 122 presents a twisted shape rather than a straight line structure.

In some embodiments, the first hollow vane 121, the connecting channel 122 and the second hollow vane 123 are all in a twisted shape, such that a swirl flow can be generated when the first fluid flows along the first flow channel 101 and moves sequentially along the rotation direction of the outer surfaces of the first hollow vane 121, the connecting channel 122 and the second hollow vane 123, which is beneficial to increase the flow length and the residence time of the first fluid, thereby improving the heat exchange efficiency. The flow resistance of the first fluid is also reduced, thereby reducing energy consumption. When the second fluid flows along the second flow channel 102, the swirl flow can be generated when the second fluid flows along the second flow channel 102 and moves sequentially along the rotation direction of the inner surfaces of the first hollow vane 121, the connecting channel 122 and the second hollow vane 123, which is beneficial to increase the flow length and the residence time of the second fluid, thereby improving the heat exchange efficiency.

Further, the twist and incline direction of the first hollow vane 121 and the second hollow vane 123 are the same, and the twist and incline direction of the connecting channel 122 and the first hollow vane 121 are opposite. For example, both the first hollow vane 121 and the second hollow vane 123 rotate positively relative to the axis of the outer sleeve 11, and the connecting channel 122 rotates reversely relative to the axis of the outer sleeve 11. It should be noted that the positive rotation and reverse rotation here are only relatively speaking, it shows the different rotation directions. Taking the flow of the first fluid (such as water) as an example, the first fluid flows along the surface of the first hollow vane 121 to generate swirling flow, and after reaching the end of the first hollow vane 121. Due to the change of the rotation direction of the connecting channel 122, the sudden change in the flow of the first fluid is beneficial for the first fluid to scour the outer surface of the connecting channel 122. The second fluid (such as refrigerant) has a longer residence time when passing through the relatively slender connecting channel 122. In this way, the convective heat transfer between the first fluid and the second fluid is improved, and the heat exchange efficiency is further improved.

Further, the connecting channel 122 is attached to the inner wall surface of the outer sleeve 11. When the first fluid scours the outer surface of the connecting channel 122, a certain impact force will be generated on the connecting channel 122. The connecting channel 122 is a slender strip structure, and the connecting channel 122 is attached to the inner wall of the outer sleeve 11, which improves the structural strength of the connecting channel 122, prevents the connecting channel 122 from being broken and damaged under long-term washing, and increases the service life of the heat exchanger 10. In addition, the connecting channel 122 is attached to the inner wall of the outer sleeve 11, which is also conducive to the integral formation of the connecting channel 122 and the outer sleeve 11. For example, the connecting channel 122 can be printed on the inner wall of the outer sleeve 11 by 3D printing technology, which can simplify the production process of the heat exchanger 10 and save costs.

Further, as shown in FIG. 3 and FIG. 4, the diversion unit group 12 also includes the first central tube 124 and the second central tube 125. The first hollow vane 121 is fixed on the outer periphery of the first central tube 124, one end of the first central tube 124 away from the connecting channel 122 is provided with a fluid inlet 1241. The other end of the first central tube 124 is closed, the peripheral wall of the first central tube 124 is provided with the first through hole 1242 communicated with the first hollow vane 121. The second hollow vane 123 is fixed on the outer periphery of the second central tube 125, one end of the second central tube 125 away from the connecting channel 122 is provided with a fluid outlet 1251, the other end of the second central tube 125 is closed, and the peripheral wall of the second central tube 125 is provided with the second through hole 1252 communicated with the second hollow vane 123.

In some embodiments, the first central tube 124 is a straight tube extending coaxially with the outer sleeve 11. The first central tube 124 is a hollow tubular structure with an open end and a closed end. One side of the first hollow vane 121 is attached to the outer peripheral surface of the first central tube 124 and is extended along the first central tube 124. The open end of the first central tube 124 is provided with a fluid inlet 1241, the side wall of the first central tube 124 is provided with a first through hole 1242, the second fluid can flow from the fluid inlet 1241 into the first central tube 124, and then flows into the first hollow vane 121 through the first through hole 1242. The second central tube 125 is a straight tube extending coaxially with the outer sleeve 11. The second central tube 125 is a hollow tubular structure with an open and a closed end. One side of the second hollow vane 123 is attached to the outer periphery of the second central tube 125 and is extended along the second central tube 125. The open end of the second central tube 125 is provided with a fluid outlet 1251, and the side wall of the second central tube 125 is provided with a second through hole 1252. The second fluid can flow from the first hollow vane 121 into the second hollow vane 123 through the connecting channel 122, then flows into the second central tube 125 through the second through hole 1252 from the second hollow vane 123, and finally flows out from the fluid outlet 1251 of the second central tube 125.

Further, in one diversion unit group 12, the plurality of the first hollow vanes 121, the connecting channels 122 and the second hollow vanes 123 are provided in a one-to-one correspondence. Each of the first hollow vanes 121 is spaced apart along the circumferential direction of the first central tube 124, and the peripheral wall of the first central tube 124 is provided with the plurality of first through holes 1242 along the circumferential direction. The first through holes 1242 and the first hollow vanes 121 are communicated in a one-to-one correspondence. Each of the second hollow vanes 123 is spaced apart along the circumferential direction of the second central tube 125, and the peripheral wall of the second central tube 125 is provided with a plurality of the second through holes 1252 along the circumferential direction. The second through holes 1252 and the second hollow vanes 123 are communicated in a one-to-one correspondence. Each of the connecting channels 122 is connected between the first hollow vane 121 and the second hollow vane 123 in a one-to-one correspondence.

In some embodiments, a plurality of first hollow vanes 121 are spaced apart along the circumferential direction of the first central tube 124, a plurality of second hollow vanes 123 are spaced apart along the circumferential direction of the second central tube 125, and a plurality of connecting channels 122 are spaced apart along the inner peripheral surface of the outer sleeve 11. One end of each connecting channel 122 is connected and communicated with the end of the first hollow vane 121 close to the inner wall surface of the outer sleeve 11, and the other end of each connecting channel 122 is connected and communicated with the end of the second hollow vane 123 close to the inner wall surface of the outer sleeve 11. A first channel is formed between any two adjacent first hollow vanes 121, a second channel is formed between any adjacent two second hollow vanes 123, and an intermediate channel is formed between the plurality of connecting channels 122.

The flow path of the first fluid along the first flow channel 101 is generally as follows. The first fluid enters the first channel from one end of the outer sleeve 11, then enters the middle channel from the first channel, and then enters the third channel from the middle channel. The flow path of the second fluid along the second flow channel 102 is generally as follows. The second fluid enters the first central tube 124 from the fluid inlet 1241 of the first central tube 124, and then passes through the plurality of first through hole 1242 on the side wall of the first central tube 124 to flow into the corresponding first hollow vane 121. Then, the second fluid enters into the corresponding connecting channel 122 at the end of each first hollow vane 121 close to the inner wall surface of the outer sleeve 11, and then enters the second hollow vane 123 through the connecting channel 122. The second fluid finally flows into the second central tube 125 through a plurality of second through holes 1252 on the outer peripheral surface of the second central tube 125, and then flows out from the fluid outlet 1251 of the second central tube 125. When entering the plurality of first hollow vanes 121 through the first central tube 124, the second fluid undergoes divergent movement in a centrifugal direction. When entering the second central tube 125 from the plurality of second hollow vanes 123, the second fluid undergoes convergent movement in a centripetal direction. The above design can further increase the contact area between the first fluid and the second fluid, prolong the flow and residence time of the first fluid and the second fluid in the corresponding flow channel, and improve the heat exchange efficiency.

Further, both the first central tube 124 and the second central tube 125 are straight tubes extending coaxially with the outer sleeve 11, and a plurality of the first hollow vanes 121 are evenly distributed at intervals along the circumferential direction of the first central tube 124. The plurality of second hollow vanes 123 are evenly distributed at intervals along the circumferential direction of the second central tube 125. In this way, on the same circumferential section, the spacing between any two adjacent first hollow vanes 121 is equal, and the spacing between any adjacent two second hollow vanes 123 is equal, so that the flow distribution of the first fluid and the second fluid is more uniform and the heat exchange between the first fluid and the second fluid is more uniform.

Further, on the basis of the above embodiments, at least two diversion unit groups 12 are provided, and each diversion unit group 12 is provided in an array along the axial direction of the outer sleeve 11 and communicates with each other in sequence. In this way, after the second fluid flows through the second flow channel 102 of the first group of diversion unit groups 12, it can immediately enter the second flow channel 102 of the next group of diversion unit groups 12, so that the second fluid can be further improved. Fluid flow path to achieve better heat transfer effect.

As shown in FIG. 1 and FIG. 2, in some embodiments, the heat exchanger 10 includes an outer sleeve 11 and at least two diversion unit groups 12 provided in the outer sleeve 11, each diversion unit group 12 includes a first central tube 124, a plurality of first hollow vanes 121, a plurality of connecting channels 122, a plurality of second hollow vanes 123, and a second central tube 125. A plurality of the first hollow vanes 121 are spaced and evenly distributed along the circumferential direction of the first central tube 124, a plurality of second hollow vanes 123 are spaced and evenly distributed along the circumferential direction of the second central tube 125, and a plurality of connecting channels 122 are attached to each other. The inner peripheral surface of the outer sleeve 11 is spaced and uniformly provided, and one end of each connecting channel 122 is connected and communicated with the first hollow vane 121, and the other end of each connecting channel 122 is connected and communicated with the second hollow vane 123. The first hollow vane 121, the connecting channel 122 and the second hollow vane 123 are twisted and inclined relative to the axis of the outer sleeve 11. The first hollow vane 121 and the second hollow vane 123 have the same twist and incline direction, and the connecting channel 122 and the first hollow vane 121 and the second hollow vane 123 have the opposite twist and incline direction.

Figure 5:
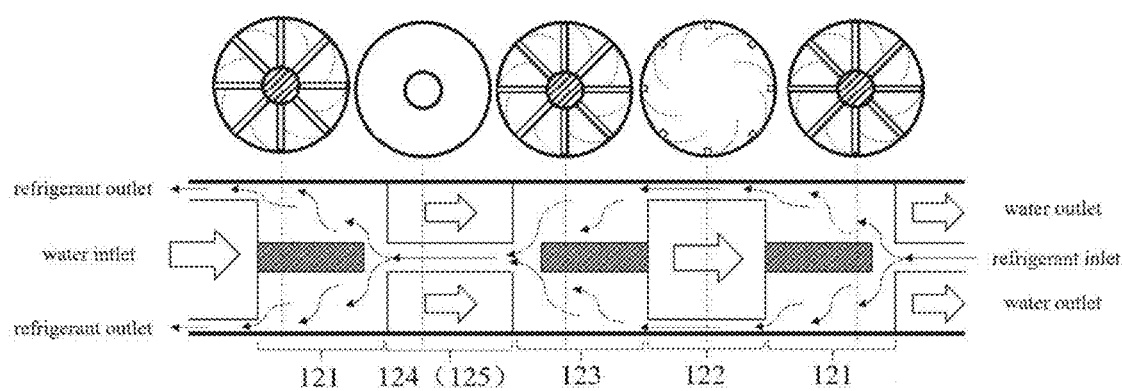
FIG. 5 is a schematic view of a flow of fluid inside the heat exchanger in FIG. 1.

In some embodiments, as shown in FIG. 1 and FIG. 5, the first fluid (such as water) enters the first channel between any two adjacent first hollow vanes 121 through an opening of the outer sleeve 11, and then passes through a plurality of the first channel to converge to the middle channel defined by the plurality of connecting channels 122, and then diverges to the second channel between any two adjacent second hollow vanes 123 through the middle channel, and finally flows out from another opening of the outer sleeve 11. A flow direction of the second fluid is opposite to the flow direction of the first fluid. The second fluid (such as refrigerant) enters the first central tube 124 from the fluid inlet 1241 of the first central tube 124, and then passes through a plurality of the first through holes 1242 on the side wall of the first central tube 124 to diverge into the corresponding first hollow vane 121 and undergoes a divergent movement in the centrifugal direction in the first hollow vane 121. Then, the second fluid enters the corresponding connecting channel 122 from the end of each first hollow vane 121 close to the inner wall surface of the outer sleeve 11, and then enters the second hollow vane 123 through the connecting channel 122 and undergoes the convergent movement in the centripetal direction in the second hollow vane 123. Finally, the second fluid passes through the plurality of second through holes 1252 of the outer peripheral surface of the second central tube 125 to converge into the second central tube 125, and then flow out from the fluid outlet 1251 of the second central tube 125 into the next diversion unit group 12.

In some embodiments, the first hollow vane 121 and the second hollow vane 123 have a sheet structure, which can increase the contact area between the first fluid and the second fluid and improve the heat exchange efficiency. The first hollow vane 121 and the second hollow vane 123 are in a twisted structure, which can induce the first fluid and the second fluid to generate swirling flow. This is beneficial for increasing the flow path of the first fluid and the second fluid, prolonging the residence time, and further enhancing the heat exchange efficiency. Additionally, it also reduces the flow resistance of the first fluid, thereby reducing energy consumption. The first hollow vane 121 and the second hollow vane 123 rotate in opposite directions to the connecting channel 122, which is beneficial for the first fluid to scour the connecting channel 122, thereby improving convective heat transfer. Generally speaking, compared with the traditional double-tube heat exchanger, under the condition of achieving the same heat exchange effect, in some embodiments, the overall length of the heat exchanger 10 may be shorter, and the occupied volume may be smaller, which may be beneficial to the miniaturization of the heat pump system 20.

Figure 6:
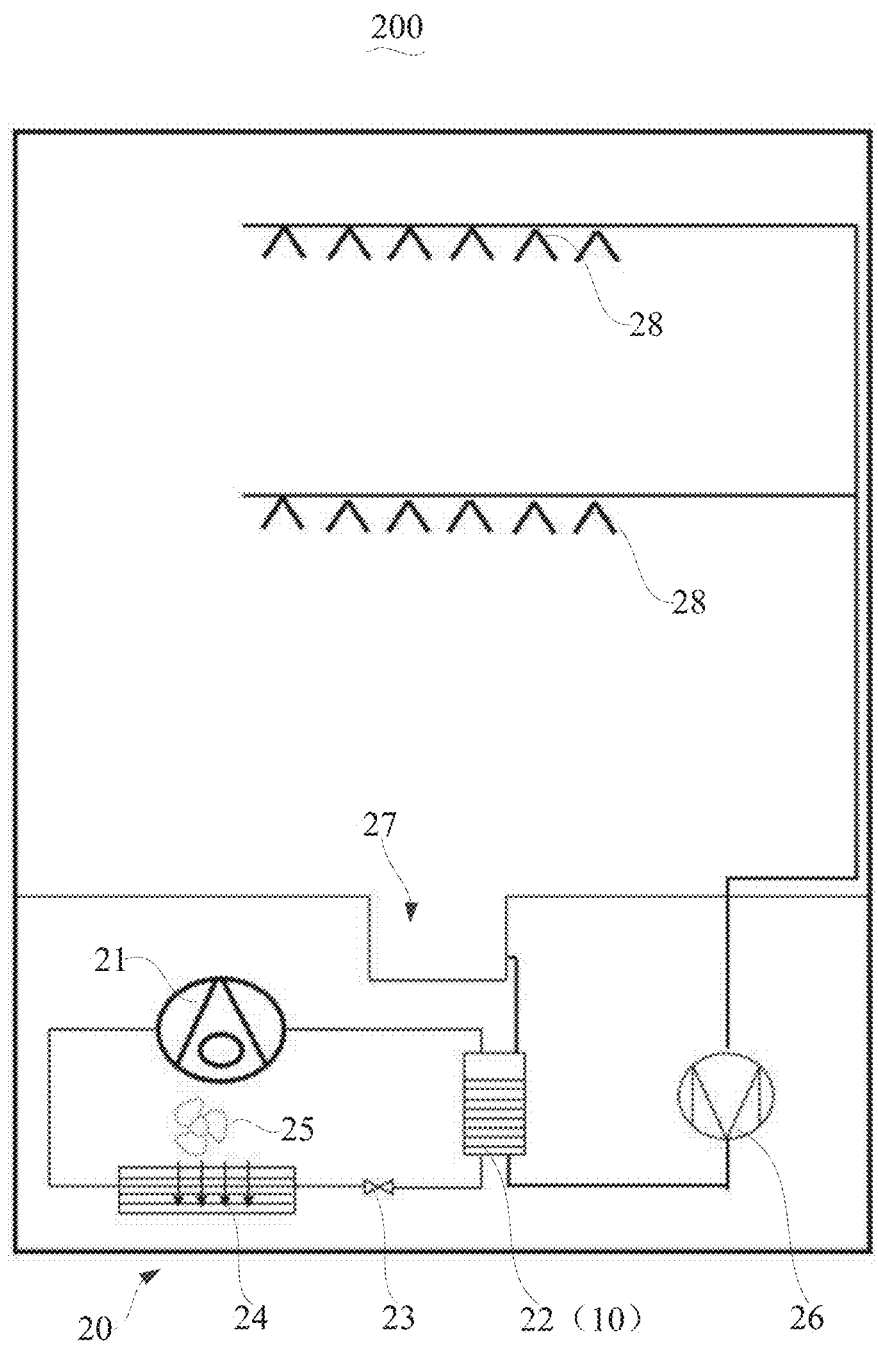
FIG. 6 is a schematic structural view of a dishwasher with a heat pump system.

As shown in FIG. 6, the present application further provides a heat pump system 20. In some embodiments, the heat pump system 20 includes a compressor 21, a condenser 22, a throttle valve 23, and an evaporator 24. The compressor 21, the condenser 22, the throttle valve 23 and the evaporator 24 are communicated with each other to form a circulation circuit, and the condenser 22 adopts the heat exchanger 10 as described above.

The heat pump system 20 in some embodiments adopts the above-mentioned heat exchanger 10 as the condenser 22. The heat exchanger 10 includes an outer sleeve 11 and a diversion unit group 12. The outer sleeve 11 is provided with two open ends, the diversion unit group 12 is provided in the outer sleeve 11, and a first flow channel 101 is formed between the outer sleeve 11 and the diversion unit group 12 for the first fluid to flow through from one end to the other end of the outer sleeve 11. The diversion unit group 12 includes a first hollow vane 121, a connecting channel 122 and a second hollow vane 123 sequentially provided along an axial direction of the outer sleeve 11. The first hollow vane 121, the connecting channel 122 and the second hollow vane 122 are sequentially connected to form the second flow channel 102 for the second fluid to flow from one end to the other end of the outer sleeve 11. Compared with the traditional double-tube heat exchanger, in the case of achieving the same heat exchange effect, the overall length of the heat exchanger 10 may be smaller, and the occupied volume may be smaller, thereby making the overall heat pump system 20 more compact, smaller in size, and higher in heat exchange efficiency. The specific structure of the heat exchanger 10 refers to the above-mentioned embodiments.

Further, the heat pump system 20 includes a plurality of the condensers 22 (heat exchangers 10), and the plurality of condensers 22 are connected to the circulation circuit of the heat pump system 20 in parallel. In this way, each condenser 22 can be controlled independently, and different quantity of the condensers 22 can be controlled to work according to actual heat exchange needs. In addition, the plurality of condensers 22 are connected in parallel without increasing the overall length of the heat pump system 20, so that the heat pump system 20 can maintain a small length while having an efficient heat exchange function.

As shown in FIG. 6, the present application further provides a dishwasher 200. In some embodiments, the dishwasher 200 includes a body and a heat pump system 20 provided in the body. The heat pump system 20 includes a compressor 21, a condenser 22, a throttle valve 23 and an evaporator 24. The compressor 21, the condenser 22, the throttle valve 23 and the evaporator 24 are communicated with each other to form a circulation circuit, and the condenser 22 adopts the heat exchanger 10 as described above. The heat exchanger 10 includes an outer sleeve 11 and a diversion unit group 12. The outer sleeve 11 is provided with two open ends, the diversion unit group 12 is provided in the outer sleeve 11, and a first flow channel 101 is formed between the outer sleeve 11 and the diversion unit group 12 for the first fluid to flow through from one end to the other end of the outer sleeve 11. The diversion unit group 12 includes a first hollow vane 121, a connecting channel 122 and a second hollow vane 123 sequentially provided along an axial direction of the outer sleeve 11. The first hollow vane 121, the connecting channel 122 and the second hollow vane 122 are sequentially connected to form the second flow channel 102 for the second fluid to flow from one end to the other end of the outer sleeve 11.

In some embodiments, as shown in FIG. 6, the heat pump system 20 is concentrated in the chassis of the dishwasher 200. The heat pump system 20 includes a compressor 21, a condenser 22, a throttle valve 23 and an evaporator 24, and the condenser 22 adopts the above-mentioned heat exchanger 10. The refrigerant channel (that is, the second flow channel 102 of the heat exchanger 10) of the condenser 22 (that is, the heat exchanger 10) is sequentially connected to the throttle valve 23, the evaporator 24 and the compressor 21 to form a circulation circuit for the refrigerant to flow. The outlet end of the water channel (that is, the first flow channel 101 of the heat exchanger 10) of the condenser 22 (that is, the heat exchanger 10) is connected to the water inlet of the circulating water pump 26, and the inlet end of the water channel is connected to the water return port of the cavity sink 27, and the water outlet of the circulating water pump 26 is connected to the spray arm 28 in the inner cavity of the dishwasher 200 through a pipeline. The quantity of spray arms 28 can be one, two or more according to actual needs.

When the dishwasher 200 works normally, the circulating water pump 26 provides power to drive circulating water for cleaning. The circulating water pump 26 pumps hot water into the spray arm 28 through the pipeline. The spray arm 28 is located in the inner cavity of the body. The hot water is sprayed on the tableware through a plurality of spray holes, and finally the hot water enters the cavity sink 27 for collection by gravity, and flows out from the water return port and enters the circulating water pump 26 through the condenser 22. The condenser 22 used in the heat pump system 20 is located between the water return port and the circulating water pump 26. One side of the condenser 22 is a water channel, and the other side of the condenser 22 is a refrigerant channel. The water heating process is completed in the condenser 22. The condenser 22 can specifically be the heat exchanger 10 adopted in the above-mentioned embodiments. The condenser 22 is the high temperature side of the heat pump system 20, used to transfer the heat of the refrigerant to water. The low temperature side of the heat pump system 20 is the evaporator 24, used for heat exchange between the refrigerant and the air. In some embodiments, the heat pump system 20 further includes a fan 25 located at the inner side of the evaporator 24. The fan 25 can specifically be an axial-flow fan. The components of the entire heat pump system 20 are separated by a fan 25. One side of the fan 25 is the condenser 22 and the compressor 21, which are closer to the circulating water pump 26 for easy connection to the water pipes. The other side of the fan 25 is the evaporator 24 and the air duct, which are located at the front side of the chassis, and is convenient to complete heat exchange with the air. The air inlet of the fan 25 is connected to the air inlet duct, the air outlet of the fan 25 is connected to the air outlet duct, and the other end of the air inlet duct is the evaporator 24. When exchanging heat with air, the air all enters the air inlet duct after passing through the evaporator 24, then enters the fan 25, and finally flows out from the air outlet duct. The air inlet and the air outlet are all at the front side of the chassis. The dishwasher 200 of this solution adopts the above-mentioned heat pump system 20, and the heat pump system 20 has a compact overall layout and occupies little space, so that the overall dishwasher 200 can be made more compact and smaller. The specific structure of the heat exchanger 10 refers to the above-mentioned embodiments. Since the dishwasher 200 adopts all the technical solutions of all the above-mentioned embodiments, it at least possesses all the beneficial effects brought by the technical solutions of the above-mentioned embodiments, which is not repeated here.

The above are only some embodiments of the present application, and are not intended to limit the scope of the present application. Under the inventive concept of the present application, the equivalent structural transformations made by using the description of the application and the contents of the accompanying drawings, or direct/indirect applications in other relevant technical fields are included in the scope of the present application.

What is claimed is:

1. A heat exchanger, comprising:
an outer sleeve provided with two open ends; and
at least one diversion unit group provided in the outer sleeve,
wherein:
a first flow channel is formed between the outer sleeve and the diversion unit group for a first fluid to flow from one end to the other end of the outer sleeve,
the diversion unit group comprises a first hollow vane, a connecting channel, and a second hollow vane sequentially provided along an axial direction of the outer sleeve, and
the first hollow vane, the connecting channel and the second hollow vane are sequentially connected to form a second flow channel for a second fluid to flow from one end to the other end of the outer sleeve, wherein the first hollow vane, the connecting channel, and the second hollow vane are twisted and inclined relative to an axis of the outer sleeve and a twist and incline direction of the first hollow vane and the second hollow vane are the same, and a twist and incline direction of the connecting channel and the first hollow vane are opposite.

2. The heat exchanger according to claim 1, wherein the connecting channel is attached to an inner wall surface of the outer sleeve.

3. The heat exchanger according to claim 1, wherein:
the diversion unit group further comprises a first central tube and a second central tube,
the first hollow vane is fixed on an outer periphery of the first central tube, one end of the first central tube away from the connecting channel is provided with a fluid inlet, the other end of the first central tube is closed, a peripheral wall of the first central tube is provided with a first through hole communicated with the first hollow vane, and
the second hollow vane is fixed on an outer periphery of the second central tube, one end of the second central tube away from the connecting channel is provided with a fluid outlet, the other end of the second central tube is closed, and a peripheral wall of the second central tube is provided with a second through hole communicated with the second hollow vane.

4. The heat exchanger according to claim 3, wherein:
in one diversion unit group, a plurality of the first hollow vanes, the connecting channels and the second hollow vanes are provided in a one-to-one correspondence,
each of the first hollow vanes is spaced apart along a circumferential direction of the first central tube, the peripheral wall of the first central tube is provided with a plurality of the first through holes along the circumferential direction, and the first through holes and the first hollow vanes are communicated in a one-to-one correspondence,
each of the second hollow vanes is spaced apart along a circumferential direction of the second central tube, and the peripheral wall of the second central tube is provided with a plurality of the second through holes along the circumferential direction, the second through holes and the second hollow vanes are communicated in a one-to-one correspondence, and each of the connecting channels is connected between the first hollow vane and the second hollow vane in a one-to-one correspondence.

5. The heat exchanger according to claim 4, wherein both the first central tube and the second central tube are straight tubes extending coaxially with the outer sleeve, a plurality of the first hollow vanes are evenly spaced apart along the circumferential direction of the first central tube, and the second hollow vanes are evenly spaced apart along the circumferential direction of the second central tube.

6. The heat exchanger according to claim 1, wherein at least two diversion unit groups are provided, and each group of the diversion unit groups is provided along the axial direction of the outer sleeve and communicated sequentially.

7. A heat pump system, comprising:
a compressor;
a condenser;
a throttle valve; and
an evaporator,
wherein the compressor, the condenser, the throttle valve, and the evaporator are communicated with each other to form a circulation circuit, and the condenser adopts a heat exchanger comprising:
an outer sleeve provided with two open ends; and
at least one diversion unit group provided in the outer sleeve,
wherein:
a first flow channel is formed between the outer sleeve and the diversion unit group for a first fluid to flow from one end to the other end of the outer sleeve,
the diversion unit group comprises a first hollow vane, a connecting channel, and a second hollow vane sequentially provided along an axial direction of the outer sleeve, and
the first hollow vane, the connecting channel and the second hollow vane are sequentially connected to form a second flow channel for a second fluid to flow from one end to the other end of the outer sleeve, wherein the first hollow vane, the connecting channel, and the second hollow vane are twisted and inclined relative to an axis of the outer sleeve and wherein a twist and incline direction of the first hollow vane and the second hollow vane are the same, and a twist and incline direction of the connecting channel and the first hollow vane are opposite.

8. A dishwasher, comprising the heat pump system according to claim 7.

9. The heat pump system according to claim 7, wherein the connecting channel is attached to an inner wall surface of the outer sleeve.

10. The heat pump system according to claim 7, wherein:
the diversion unit group further comprises a first central tube and a second central tube,
the first hollow vane is fixed on an outer periphery of the first central tube, one end of the first central tube away from the connecting channel is provided with a fluid inlet, the other end of the first central tube is closed, a peripheral wall of the first central tube is provided with a first through hole communicated with the first hollow vane, and
the second hollow vane is fixed on an outer periphery of the second central tube, one end of the second central tube away from the connecting channel is provided with a fluid outlet, the other end of the second central tube is closed, and a peripheral wall of the second central tube is provided with a second through hole communicated with the second hollow vane.

11. The heat pump system according to claim 10, wherein:
in one diversion unit group, a plurality of the first hollow vanes, the connecting channels and the second hollow vanes are provided in a one-to-one correspondence,
each of the first hollow vanes is spaced apart along a circumferential direction of the first central tube, the peripheral wall of the first central tube is provided with a plurality of the first through holes along the circumferential direction, and the first through holes and the first hollow vanes are communicated in a one-to-one correspondence,
each of the second hollow vanes is spaced apart along a circumferential direction of the second central tube, and the peripheral wall of the second central tube is provided with a plurality of the second through holes along the circumferential direction, the second through holes and the second hollow vanes are communicated in a one-to-one correspondence, and
each of the connecting channels is connected between the first hollow vane and the second hollow vane in a one-to-one correspondence.

12. The heat pump system according to claim 11, wherein both the first central tube and the second central tube are straight tubes extending coaxially with the outer sleeve, a plurality of the first hollow vanes are evenly spaced apart along the circumferential direction of the first central tube, and the second hollow vanes are evenly spaced apart along the circumferential direction of the second central tube.

* * * * *